US008456144B2

(12) United States Patent
Chatroux et al.

(10) Patent No.: US 8,456,144 B2
(45) Date of Patent: Jun. 4, 2013

(54) POWER SUPPLY WITH NON-ISOLATED DC DC SPLITTING (75) Inventors: Daniel Chatroux, Teche (FR); Jean-Claude Dolhagaray, Saclay (FR); Francis Roy, Les Ulis (FR)

(73) Assignees: Commissariat a l'Energie Atomique et aux Energies Alternatives, Paris (FR); Peugeot Citroen Automobiles SA, Velizy Villacoublay (FR)

( * ) Notice: Subject to any disclaimer, the term of this patent is extended or adjusted under 35 U.S.C. 154(b) by 359 days.

(21) Appl. No.: 12/933,606

(22) PCT Filed: Mar. 18, 2009

(86) PCT No.: PCT/EP2009/053215
§ 371 (c)(1),
(2), (4) Date: Sep. 20, 2010

(87) PCT Pub. No.: WO2009/115559
PCT Pub. Date: Sep. 24, 2009

(65) Prior Publication Data
US 2011/0018519 A1  Jan. 27, 2011

(30) Foreign Application Priority Data
Mar. 21, 2008  (FR) ...................................... 08 01574

(51) Int. Cl.
*G05F 1/613*  (2006.01)

(52) U.S. Cl.
USPC ..................... 323/235; 363/56.12; 323/272

(58) Field of Classification Search
USPC ................ 323/235, 272, 319; 363/56.12
See application file for complete search history.

(56) References Cited

U.S. PATENT DOCUMENTS

| | | | | |
|---|---|---|---|---|
| 6,051,961 A * | 4/2000 | Jang et al. | | 323/224 |
| 7,332,897 B2 * | 2/2008 | Lee et al. | | 323/222 |
| 7,602,624 B2 | 10/2009 | Nakashima | | |
| 8,189,351 B2 * | 5/2012 | Chung et al. | | 363/17 |
| 2003/0095421 A1 | 5/2003 | Kadatskyy et al. | | |
| 2007/0013349 A1 | 1/2007 | Bassett | | |
| 2007/0262823 A1 * | 11/2007 | Cohen et al. | | 331/45 |
| 2008/0094866 A1 * | 4/2008 | Bauman et al. | | 363/50 |

FOREIGN PATENT DOCUMENTS

DE  102006017851  1/2007

* cited by examiner

*Primary Examiner* — Harry Behm
(74) *Attorney, Agent, or Firm* — Nicolas E. Seckel

(57) ABSTRACT

A power supply with non-isolated DC DC splitting includes n conversion cells that are interlaced. The splitting switch of each cell is placed in a resonant circuit. The resonant circuit makes it possible to obtain a switching to the open state of said switch at zero current and voltage. The ripple at the input and output is minimized and the efficiency improved. In particular, the wiring inductances in the charge transfer loop of each cell no longer have negative effects on the efficiency. The cell may be of boost, buck, buck/boost, Cuk or SEPIC topology.

9 Claims, 8 Drawing Sheets

POWER SUPPLY WITH NON-ISOLATED DC DC SPLITTING

CROSS-REFERENCE TO RELATED APPLICATIONS

This application is a National Stage of International patent application PCT/EP2009/053215, filed on Mar. 18, 2009, which claims priority to foreign French patent application No. FR 08 01574, filed Mar. 21, 2008, the disclosures of which are incorporated by reference in their entirety.

FIELD OF THE INVENTION

The present invention relates to a power supply with non-isolated DC DC splitting, in particular for fuel cells.

BACKGROUND OF THE INVENTION

Fuel cells are used in many applications. They are for example used as a source of energy in electric motor vehicles, or for recharging batteries, for example for recharging batteries of portable devices (telephones for example).

The electric energy produced by a fuel cell cannot usually be used directly. Specifically the cell does not supply a constant voltage. The voltage produced is usually weaker than necessary for the application, the number of cells of the fuel cell usually being optimized according to technical and cost criteria. Finally, the output voltage varies with the current.

Power supplies with non-isolated DC DC splitting are therefore used to regulate and bring the voltage supplied by a fuel cell to a required level.

These power supplies, also called converters or choppers, allow conversion from one continuous voltage to another continuous voltage over a voltage range from a few volts to a few thousand volts. More generally, they make it possible to convert one continuous voltage to another continuous voltage which may be higher or lower and which may be of the same polarity or of inverse polarity, depending on the topology of the power supply.

A power supply with DC DC splitting is an electric circuit that is usually tripolar with an input terminal, an output terminal and a common terminal. This electric circuit comprises at least one switch and one diode and one energy storage element, typically an inductor. The input voltage is applied between the input terminal and the common. An output capacitor is connected between the output terminal and the common. The transfer of energy from the input to the output is carried out by means of the energy storage element which stores the energy and then restores it at the rate of the switching of the switch to the open state and the closed state. The voltage is regulated by the conduction time (closed state) of the splitting switch.

Depending on the power range and on the gain sought for an application, various well known power supply topologies are proposed. These are the voltage step-up, called "boost", voltage step-down, "buck", voltage inverter and step-up/step-down, "buck-boost" topologies, "Cuk" topologies from the name of its inventor or voltage step-up/step-down or SEPIC ("Single ended primary inductor converter") topologies.

The switch S is usually produced by a field effect transistor. That is why reference is made without distinction to a switch in the open state, or off state, and the closed state or on state. Typically in the range of input and output voltages from a few volts to several thousands of volts, use is preferably made of a transistor of the IGBT (Isolated Gate Bipolar Transistor) type capable of withstanding high voltages at its terminals.

This technological solution makes it possible to ensure the reliability of the converter while minimizing the cost of the components.

Figure 1A:
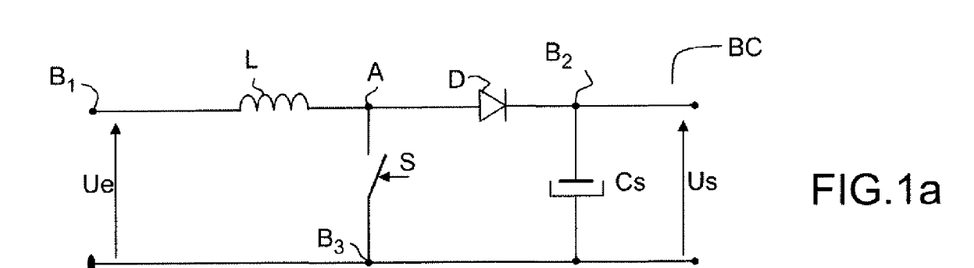
FIGS. 1a, 1b, 1c, already described, illustrate a voltage step-up cell of the boost type, and its two operating phases.

FIG. 1a therefore illustrates a voltage step-up converter BC (boost). It is a tripole with a star topology (as for the buck or buck/boost converters): a switch S, an inductor L and a diode D each form one branch of the tripole. The branches all start from a common node A, and their termination forms one of the three terminals of the tripole.

In a converter of the step-up type, the switch S is connected between the node A and the common terminal B3. The diode has its anode connected to the node A, and its cathode connected to the output terminal B2. The inductor L is connected between the input terminal B1 and the node A.

The switch is controlled usually by a pulse signal with constant frequency which alternately places it in an open state and a closed state.

Figure 1B:
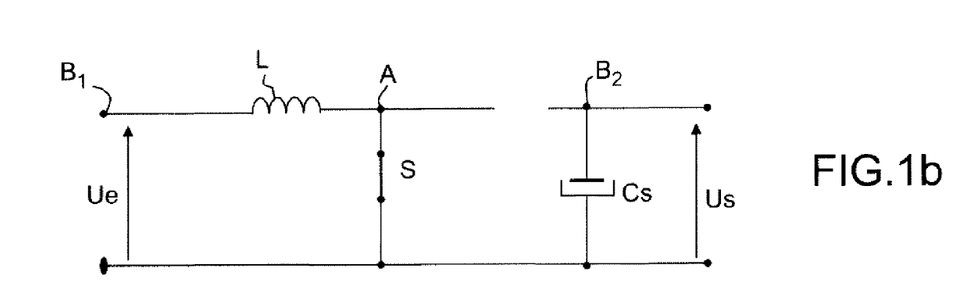
Figure 1C:
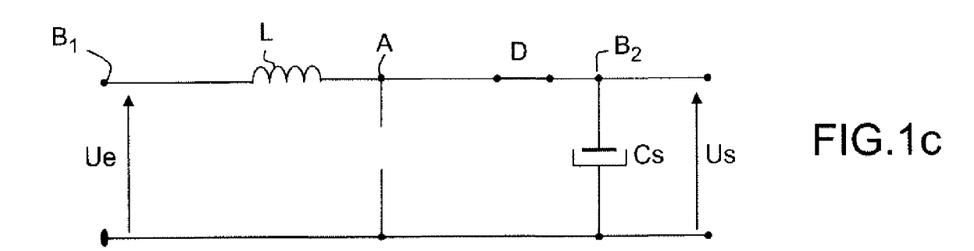

The two operating phases of such a converter, which correspond to the two states, closed and open, of the switch S, are as follows:
- when the switch S is closed: the inductor L is in parallel on the input voltage source and the current increases in the inductor. This is the energy storage phase. The diode D is then disabled. The equivalent wiring diagram is illustrated in FIG. 1b.
- when the switch S is open, the inductor L is in series with the input voltage source $U_e$. The current passes through the inductor L and the diode D and the output capacitor $C_s$ is charged. This is the energy transfer phase. The equivalent wiring diagram is illustrated in FIG. 1c.

The voltage at the terminals of the output capacitor $C_s$ becomes higher than the input voltage. The output voltage level depends in practice on the durations of the open and closed times of the switch. If the splitting power supply works at a constant frequency f and in continuous conduction mode (that is to say that the current passing through the inductor is never cancelled out), the output voltage Us is equal to $\alpha^*U_e$, where α is the duty factor between the closing time of the switch and the complete period of the cycle (1/f=t).

In a known manner, splitting power supplies have the drawback of causing a ripple of the current in the output capacitor, and at input. The amplitude of the ripple is moreover one of the criteria for measuring the quality of such a power supply.

Certain electric energy sources such as the fuel cell for example do not withstand such a ripple of current, which has the effect of reducing its service life.

To solve this problem, it is known practice to use a splitting power supply with interlaced cells. Each cell is a converter. The concept of interlacing arises from the fact that the cells conduct in turn to an output capacitor.

Figure 2:
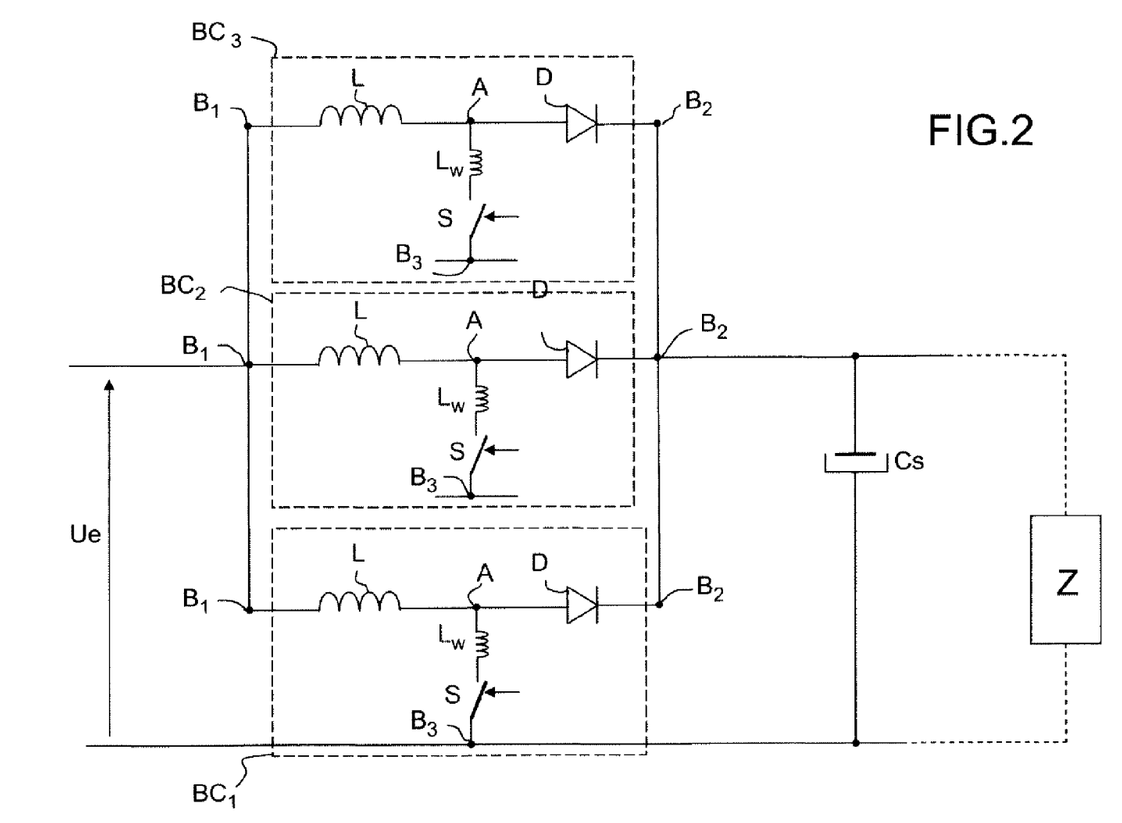
FIGS. 2 and 3 illustrate two embodiments of a power supply with DC DC splitting with interlaced cells, according to the prior art.

FIG. 2 illustrates such a splitting power supply with interlaced cells in the voltage step-up (boost) converter topology of FIG. 1a. More particularly it illustrates a first exemplary embodiment in which the cells are all connected to the same output capacitor Cs.

In the example, the power supply comprises n=3 identical cells BC1, BC2, BC3 (L, S, D) in parallel: their terminals B1 are connected together; their terminals B2 are connected together; their terminals B3 are connected together. The power supply comprises a single output capacitor CS connected between the output terminals B2 and common terminals B3 of each cell. The input voltage Ue is applied between the input terminals B1 and common terminals B3 of each cell.

The n switches are each controlled as indicated above with FIG. 1a, with a time shift of fixed duration, corresponding to a phase shift between each cell of 2π/nf. The frequency of the currents and voltages seen by the load is therefore n times greater than that which is obtained with a single cell. The ripples at the input and in the output capacitor are reduced.

In the exemplary embodiment of FIG. 2, there is a single output capacitor Cs for the n interlaced cells. It is therefore a high-volume capacitor. In each cell, there is a wiring inductance Lw of the switch S, diode D, capacitor Cs loop. Since the capacitor is of high volume, the connections necessary for producing each loop are long. For these reasons the wiring inductances Lw are high and induce considerable losses. The efficiency of the power supply is degraded.

Moreover, provision is usually made to place the switches and diodes at the surface of a heat sink or of a water plate in order to allow the evacuation of the heat losses dissipated by these components. For the evacuation to be effective, it is necessary to spread the switches and diodes over the surface of the heat sink or of the water plate so as to ensure a certain distance between them. In these conditions, with a single output capacitor, common to the n cells, the distances between the switches and the diodes are increased which has the effect of also increasing the wiring inductances.

Figure 3:
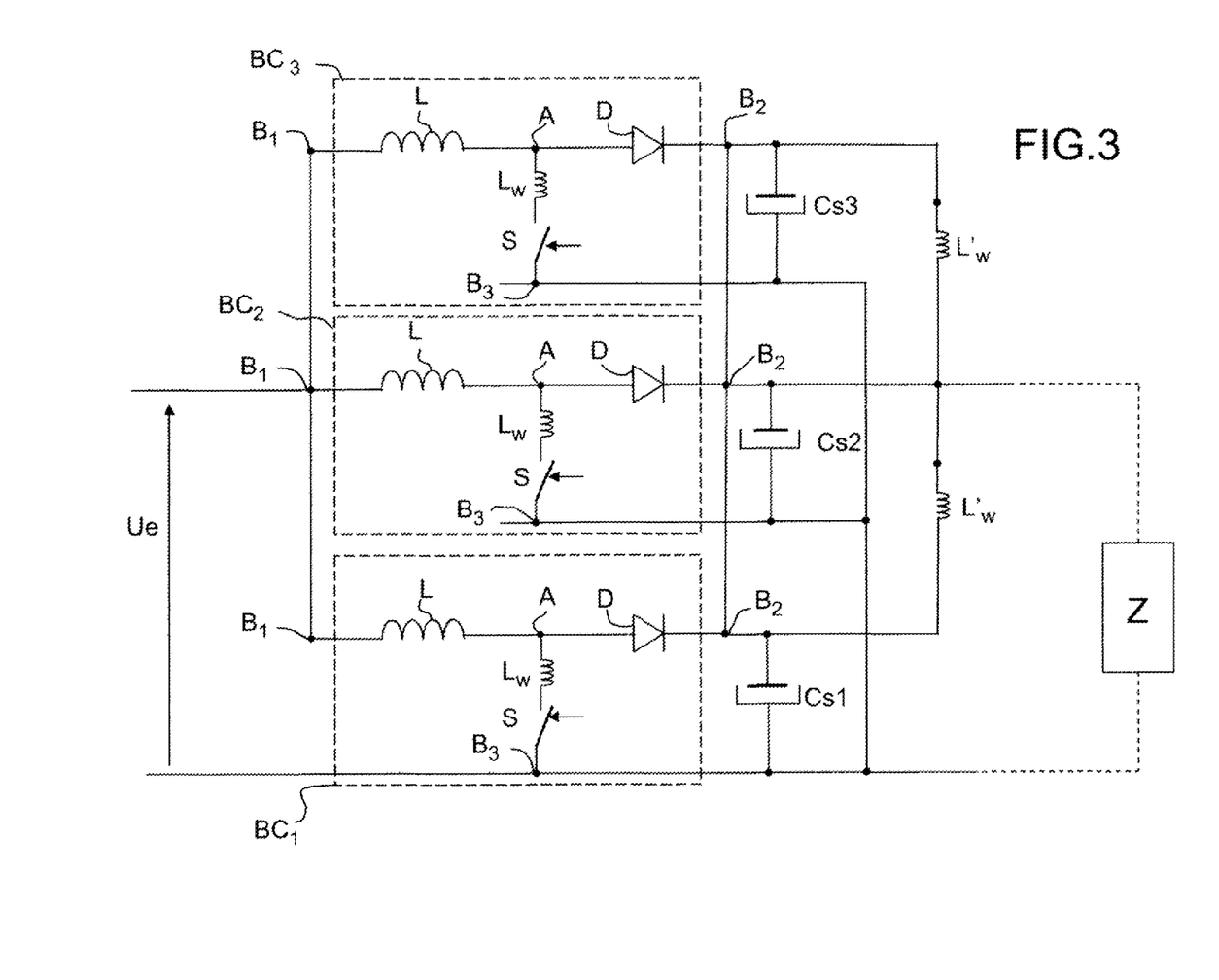

One way of solving this problem is to provide an output capacitor Cs1, Cs2, Cs3 for each cell BC1, BC2, BC3 as illustrated in FIG. 3. The wiring inductances Lw of the loops are then reduced by the closeness of the components of each cell to the associated capacitor. The various switches and diodes can be better spread on the surface of the cooling device without degrading these inductances Lw, allowing an optimized evacuation of the heat losses of these components. Each capacitor is placed close to the associated diode and switch.

But this produces additional wiring inductances L'w between the capacitors (FIG. 3). These wiring inductances have the drawback of opposing the interchanges of currents between the capacitors and of limiting the effectiveness of the interlacing: the effective currents in each of the capacitors are higher, which degrades the efficiency of the power supply, and the current ripple in the output capacitors and the output voltage ripple are greater.

SUMMARY OF THE INVENTION

The invention proposes to solve the technical problem posed by the wiring inductances between the components in the cells, that is to say the reduction in efficiency, the current ripple at the input and at the output and the heat evacuation problems.

A technical solution has been found in the association of a resonant circuit with each switch, so that the switching to the open state of each switch can be carried out at zero current and voltage. This produces a power supply with DC DC splitting with interlaced DC DC cells with low ripple and high efficiency.

The invention therefore relates to a power supply with non-isolated DC DC splitting, for supplying a direct current voltage based on a direct current voltage applied to the input, comprising n parallel, interlaced conversion cells, n being at least equal to 2, each cell comprising a switch receiving a command to switch to the closed state and to the open state in order respectively to close or open a conduction path between a first node and a second node of the cell, allowing respectively a phase for storing energy in a storage element and a phase for transferring energy to an output capacitor connected between an output terminal of the cell and a common terminal, characterized in that said switch is placed between said first and second nodes in a resonant circuit.

The resonant circuit comprises an auxiliary switch for triggering a resonance phase. This resonance phase allows a switching to the open state of the switch of the corresponding cell at zero current and voltage.

The invention also relates to a system for powering a load, comprising a fuel cell, and a power supply with DC DC splitting capable of supplying at the output a regulated level of continuous voltage to the load.

BRIEF DESCRIPTION OF THE DRAWINGS

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive. In these drawings.

DETAILED DESCRIPTION

The invention relates to a power supply with DC DC splitting, with interlacing of n cells. It is explained by taking more particularly the example of a voltage step-up or boost topology. But it applies more generally to all the topologies of a power supply with DC DC splitting, whether they be of the step-up (boost), step-down (buck), step-up/step-down (SEPIC), or step-up/step-down and inverter (buck/boost, Cuk) type. These various topologies are well known. They comprise a conversion cell comprising a splitting switch the switching of which to the closed state controls an energy storage phase, and the switching of which to the open state controls an energy transfer phase to an output capacitor.

More particularly, in these topologies, a conversion cell comprises a switch the closed (on) state of which and the open (off) state of which respectively closes or opens a conduction path between a first node and a second node of the cell, allowing respectively a phase for storing energy in a storage element and a phase for transferring energy to an output capacitor.

According to the invention, in each cell, the splitting switch is placed in a resonant circuit.

This resonant circuit allows the splitting switch to be in the off state at zero current, in order to switch from the storage phase to the transfer phase. The off state also occurs at zero voltage. The technical effect produced by an off state without losses is to render the wiring inductances Lw of the charge transfer loop to have no effect on the efficiency of the power supply. Therefore, even though they are high, they are no longer involved in the conversion. It is therefore possible to ignore them, use a large output capacitor common to all the cells and place the components in an optimal manner in the space, notably the diodes and the switches, with respect to the evacuation of heat.

The combination of a topology with interlacing of cells and with a resonant circuit associated with the splitting switch of each cell therefore makes it possible to obtain a power supply with DC DC splitting with low ripple and high efficiency.

Figure 4:
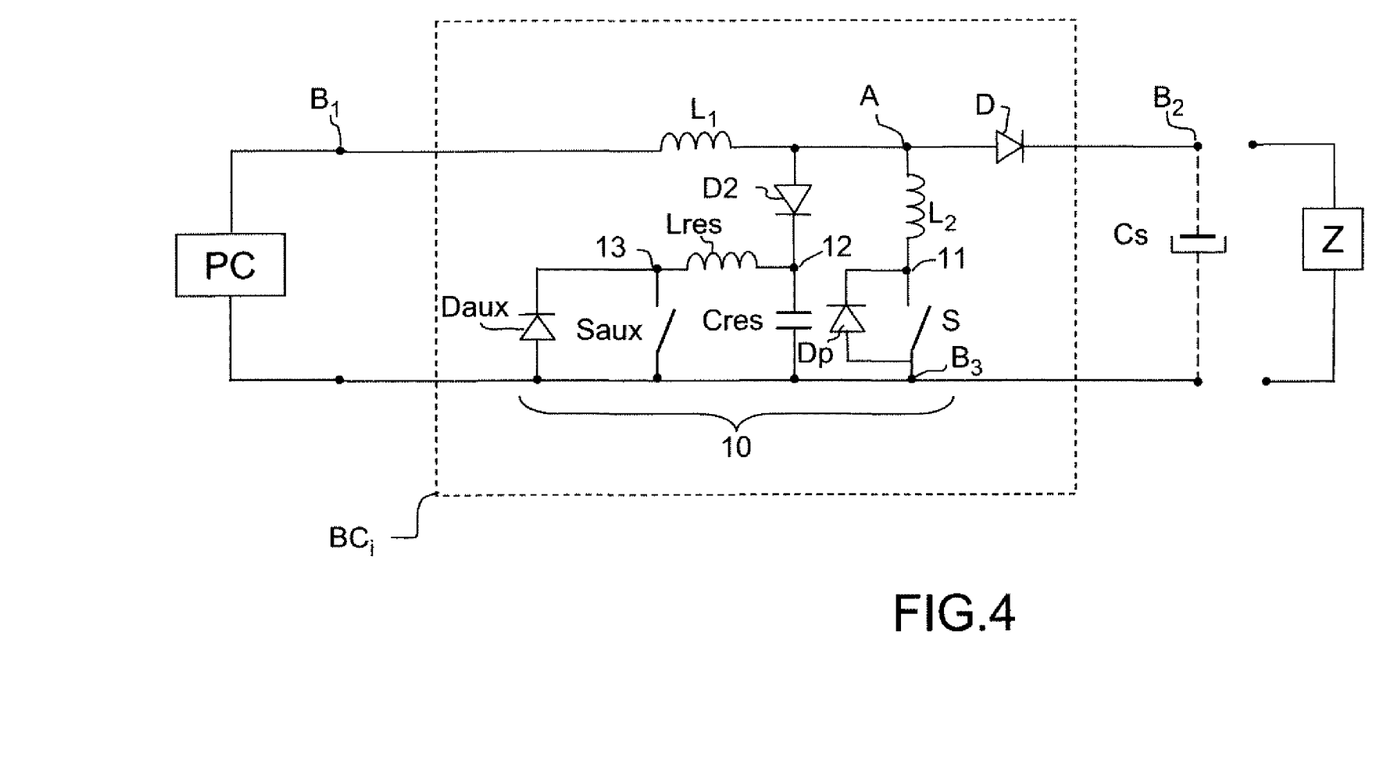
FIG. 4 is a diagram of a voltage step-up cell comprising a resonant circuit associated with the splitting switch according to the invention.

FIG. 4 illustrates an embodiment of the invention applied to cells BCi of the voltage step-up type of a power supply with DC DC splitting with n interlaced cells BCi, n being an integer at least equal to 2.

The cell BCi comprises a splitting switch S, an inductor L and a diode D connected in star formation as already described above with respect to FIG. 1a. The switch S notably is connected between the node A and the node B3. When it is switched to the closed state, it closes the conduction path between these two nodes A and B3, thus looping the inductor L to the voltage source Ue: this is the energy storage phase. When it is switched to the open (or off) state, it opens this conduction path between A and B3 which triggers the phase for transferring energy into the output capacitor Cs.

The switch S is placed in a resonant circuit 10. The function of this resonant circuit 10 is to allow the switching to the open state of the switch S at zero current. The transition from the closed state to the open state also takes place at zero voltage. The opening of the switch S is therefore carried out without losses. In these conditions, the wiring inductance Lw of the energy transfer loop S, D, CS (FIG. 2) then has no impact on the efficiency of the cell. It is then possible to produce a splitting power supply with n interlaced cells and an output capacitor Cs common to the n cells, with optimal efficiency.

The resonant circuit comprises notably an auxiliary switch Saux by which a resonance phase is triggered, during the energy storage phase, while the switch S is closed.

The resonance makes it possible to cancel the current in the switch S. The latter can then be switched to the open state, causing the power supply to switch to the energy transfer phase.

Advantageously it also makes it possible to cancel the current in the auxiliary switch Saux, which can be switched to the off state without losses (at zero current).

In a preferred embodiment, the resonant circuit 10 comprises:
- an inductor $L_2$ connected in series between the switch S and the node A, and a diode Dp connected in parallel to the switch with its anode connected to the node $B_3$ and its cathode connected to the connection point 11 between the switch S and the inductor $L_2$;
- a diode $D_2$ and a resonance capacitor Cres connected in series between the nodes A and $B_3$;
- an inductor Lres and an auxiliary switch Saux in parallel on the resonance capacitor Cres, the inductor being connected to the connection point 12 between the resonance capacitor Cres and said second diode;
- a second diode Daux in parallel on the auxiliary switch Saux, with its cathode connected to the connection point 13 between the auxiliary switch Saux and the inductor Lres.

In practice, the diodes Daux and Dp can each be achieved by a discrete component placed in parallel on the associated IGBT transistor, that is to say in parallel on Saux and S respectively, or else integrated with this transistor in one and the same package.

The various operating phases of the cell BC, with the resonant circuit 10 according to the invention are as follows:
Energy storage phase ST (FIGS. 5 to 7): the switch S is controlled to the closed (on) state. The diode D is switched off. The inductor L of the cell accumulates the electric energy in electromagnetic form.
Resonance phase R (FIGS. 5 to 7): the switch Saux is switched to the closed (on) state. The diode D is off; the switch S is always closed.

Figure 5:
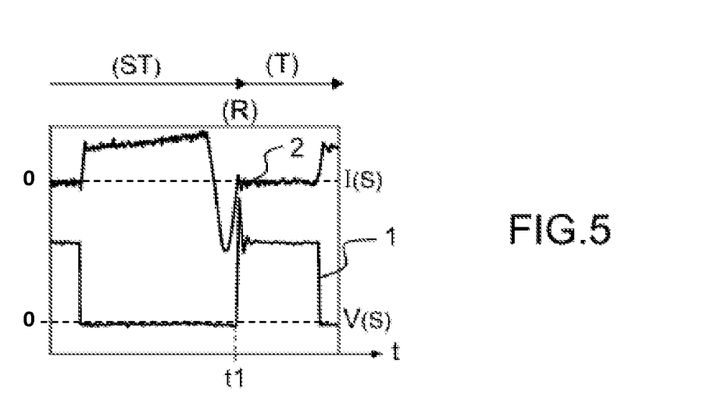
FIGS. 5, 6 and 7 illustrate current and voltage wave forms in such a cell according to the invention.
Figure 6:
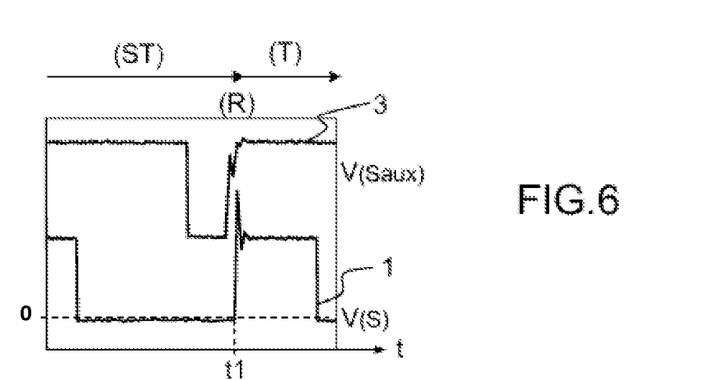
Figure 7:
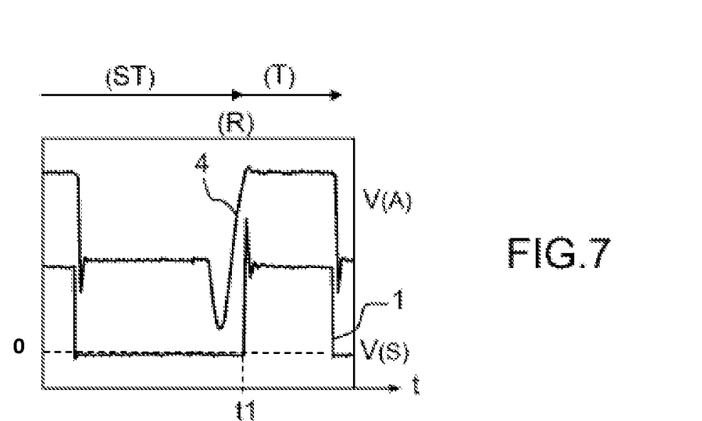

The switching to the closed state of the switch Saux causes a resonance to be established between the capacitor Cres and the inductor Lres: the voltage at the terminals of the capacitor Cres falls until it is inverted; and the diode D2 is set to conduct when the voltage of its cathode (node 12) becomes lower than that of its anode (node A). The current passing through the diode D2 makes it possible to cancel the current in the switch S. The switch S can be switched to the open state, causing the conversion cell to switch to the energy transfer phase.

When the current in the switch S is cancelled, the diode in parallel Dp makes it possible to allow the inverse current to pass and to terminate the resonance phase, with the inductor L2, which then becomes involved since the diode Dp is conducting: the voltage at the terminals of the switch S is also zero, through the conduction of Dp. The switching of the switch S to the open state can therefore be a soft switching, with no energy losses.

With the switch S switched to the open state, the energy transfer phase begins:
Energy transfer phase T (FIGS. 5 to 7):
The diode D is conducting, the switch S is open and the switch Saux is open. The energy is transferred from the inductor L to the output capacitor $C_s$. The capacitor Cres is charged at the output voltage $U_s$.

Compared with the prior art, this gives an additional phase, the resonance phase R, at the end of the energy storage phase ST. This resonance phase is triggered by the switching to the closed state of the auxiliary switch Saux. This resonance phase makes it possible to cancel the current in the switch S. It also makes it possible to cancel the voltage at its terminals. The switching of the switch S to the open state can therefore be carried out without losses.

Moreover, when the switch S is set to conduction, the diode D is not immediately in the off state: it conducts an inverse current for a time known as the inverse overcurrent time. During this inverse overcurrent time, the voltage at the terminals of the switch S is then the output voltage. Without the inductor L2 of the resonant circuit, it would be traversed by a high level of current causing high dissipation. The inductor $L_2$ has the effect of slowing down the increase in current in the diode D and in the switch S during this inverse overcurrent phase: the inductor $L_2$ therefore makes it possible, in the inverse overcurrent phase of the diode D, to limit the losses in the switch S and to allow a gentler switch to the off state of the diode D, with a reduction in the overvoltage at its terminals. This also makes it possible to minimize the conducted or emitted electromagnetic losses.

In a more detailed manner, note that, when a switch is set to conduction, the voltage drops at its terminals with a certain speed, while the latter is traversed by the current which begins to be established. During this phase in which a high voltage is presented at the terminals of the component while the latter is already traversed by a current, the switch therefore has a considerable internal dissipation.

The inductor L2 of the resonant circuit 10 of the invention makes it possible to limit the speed of increase of the current in the switch S. The level of current therefore becomes lower during the voltage-drop phase at the terminals of the switch and the internal losses of the switch are greatly reduced.

Note that the switching to off mode of a diode goes through an inverse overcurrent phase during which it is incapable of blocking an inverse current that passes through it. This phase lasts as long as the carrier electrons and holes have not been evacuated or are not recombined. The duration of this phase is called the inverse overcurrent time and usually abbreviated to trr.

If consideration is given to the cell BC in FIG. 1a, during the setting to conduction of the switch S, the diode D is therefore incapable of switching itself off immediately: it remains conductive and is traversed by an inverse current for as long as the inverse overcurrent phase lasts. During this phase, the voltage at the terminals of the switch S is the output voltage Us (since the diode is conducting in reverse): it is traversed by a high level of current which is for example of the order of a third of the nominal current in the cell. For this reason of simultaneous presence of very high voltage at the terminals of the switch and of current, the inverse overcurrent phase is highly dissipative.

The inductor L2 of the resonant circuit 10 of the invention, as illustrated in FIG. 4, makes it possible to slow the speed of increase of the current in the switch S (which is in the on state) in this inverse overcurrent phase. In this manner, the losses in the switch are reduced.

The speed of increase of the inverse current in the diode is also slowed. This makes it possible to promote the recombination of the carriers in the diode, rather than the evacuation of these carriers by the current. The result of this is a gentler switching off of the diode and a reduced overvoltage at the terminals of the diode. In this manner, the diode is switched off with fewer losses.

The losses in the main switch S during the switchings to the on state are therefore reduced: the switchings are gentle.

In a similar manner, the resonant circuit 10 according to the invention makes it possible to force the switching off of the auxiliary switch Saux without losses, at zero current and at zero voltage, when the diode Daux conducts and to help its setting to conduction by the inductor Lres: the inductor Lres slows down the rise of current in the switch Saux, which makes it possible to reduce the losses in this switch and to have a gentle switching. As illustrated in the timing chart of FIG. 10, in each cell:
- the switch Saux of each cell is controlled by a control signal so that the switch Saux conducts (is closed) for a fixed duration $t_{aux}$.
- the switch S is controlled so as to conduct during a period $\alpha t + t_{aux}$.
- the two switches S and Saux switch to the open or off state in a synchronized manner.

Figure 10:
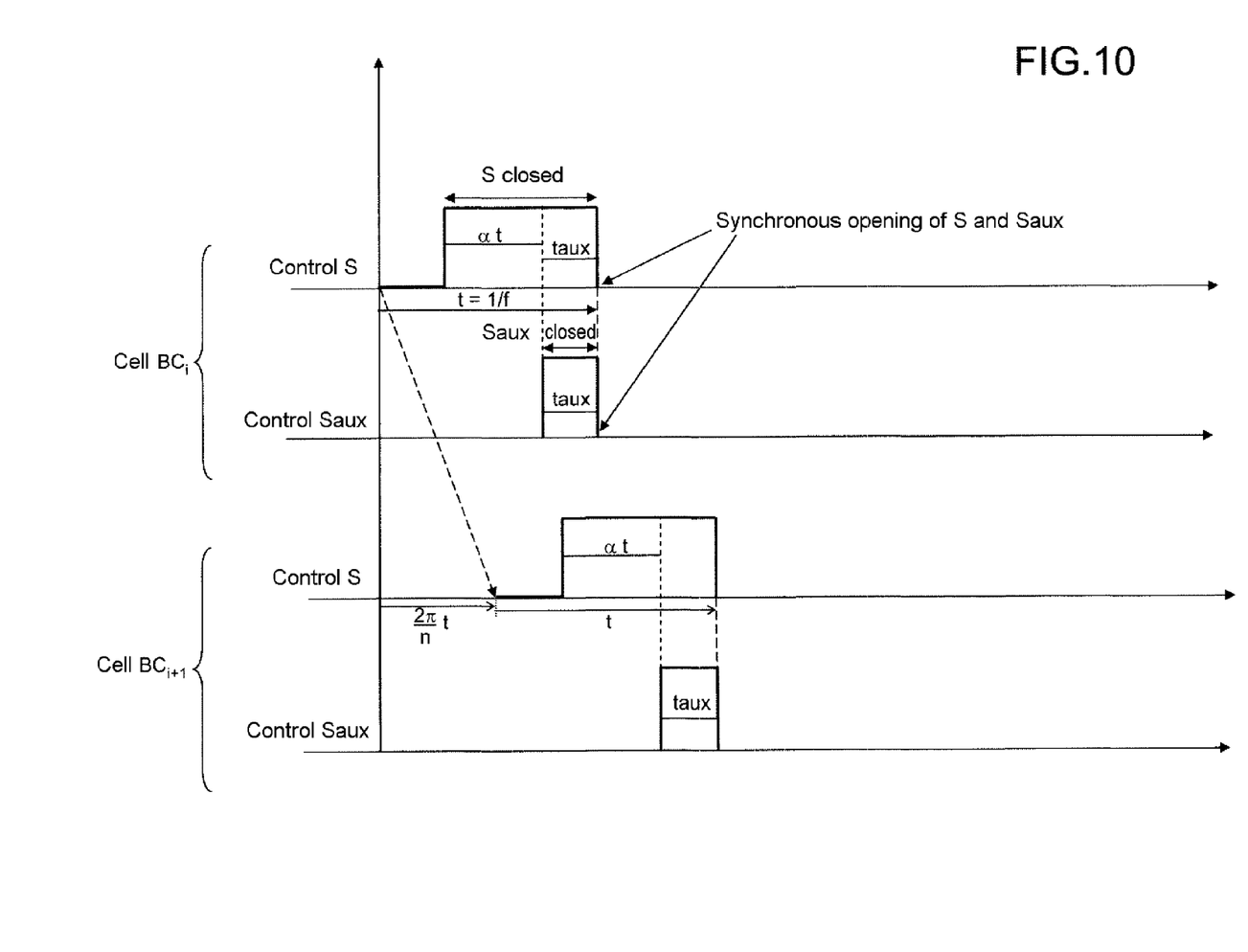
FIG. 10 is a timing chart of the signals for controlling the switches S and the auxiliary switches Saux of two conversion cells of a splitting power supply according to the invention.

The transition to the open state of the switch S of a cell, for example of the cell $BC_i$, is offset from the transition to the open state of the switch S of another cell, for example by $BC_{i+1}$, by $$\frac{2\pi}{n}t.$$

In practice, the various control signals are generated in a known manner by circuits such as pulse width modulation circuits (in order to generate $\alpha t$, or $\alpha t + t_{aux}$, typically), and fixed-duration time shift circuits (for the durations taux and $$\frac{2\pi}{n}t$$

typically), with durations determined by simulation. As a variant, it is possible to provide circuits for detecting open or closed conditions, such as, for example, circuits for detecting a current or a zero voltage. These applications are usual techniques.

The curves of FIGS. 5, 6 and 7 show the wave forms obtained for a cell $BC_i$, comprising a resonant circuit associated with the splitting switch according to the invention.

In FIG. 5, the curves 1 and 2 show the voltage at the terminals of the switch S and the current passing through it. Note in particular the switching to the open state, at zero current and voltage, at the time t1.

In FIG. 6, the above curve 1 reappears showing the voltage at the terminals of the switch S and there is a curve 3 showing the voltage at the terminals of the switch Saux.

In FIG. 7, the curve 1 reappears showing the voltage at the terminals of the switch S and there is a curve 4 showing the voltage V(A) of the anode (node A) of the diode D relative to zero volt.

The 3 figures clearly show the three operating phases of storage ST, of resonance R, and of energy transfer T. The moment t1 indicated in FIGS. 5 to 7 corresponds to the synchronous transition to the open or off state of the switches S and Saux marking the transition to the energy transfer phase (T) and the end of the resonance phase (R).

Figure 8:
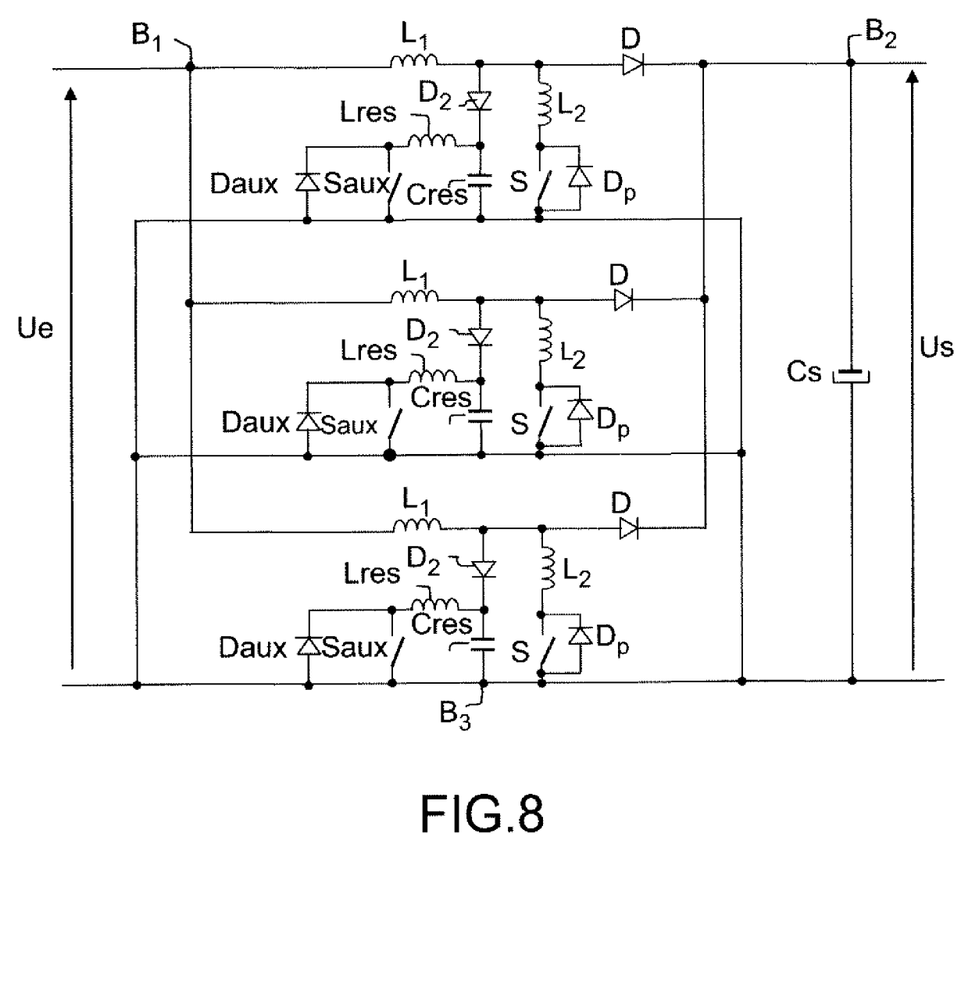
FIGS. 8 and 9 illustrate two corresponding exemplary embodiments of a power supply with DC DC splitting with interlaced cells.
Figure 9:
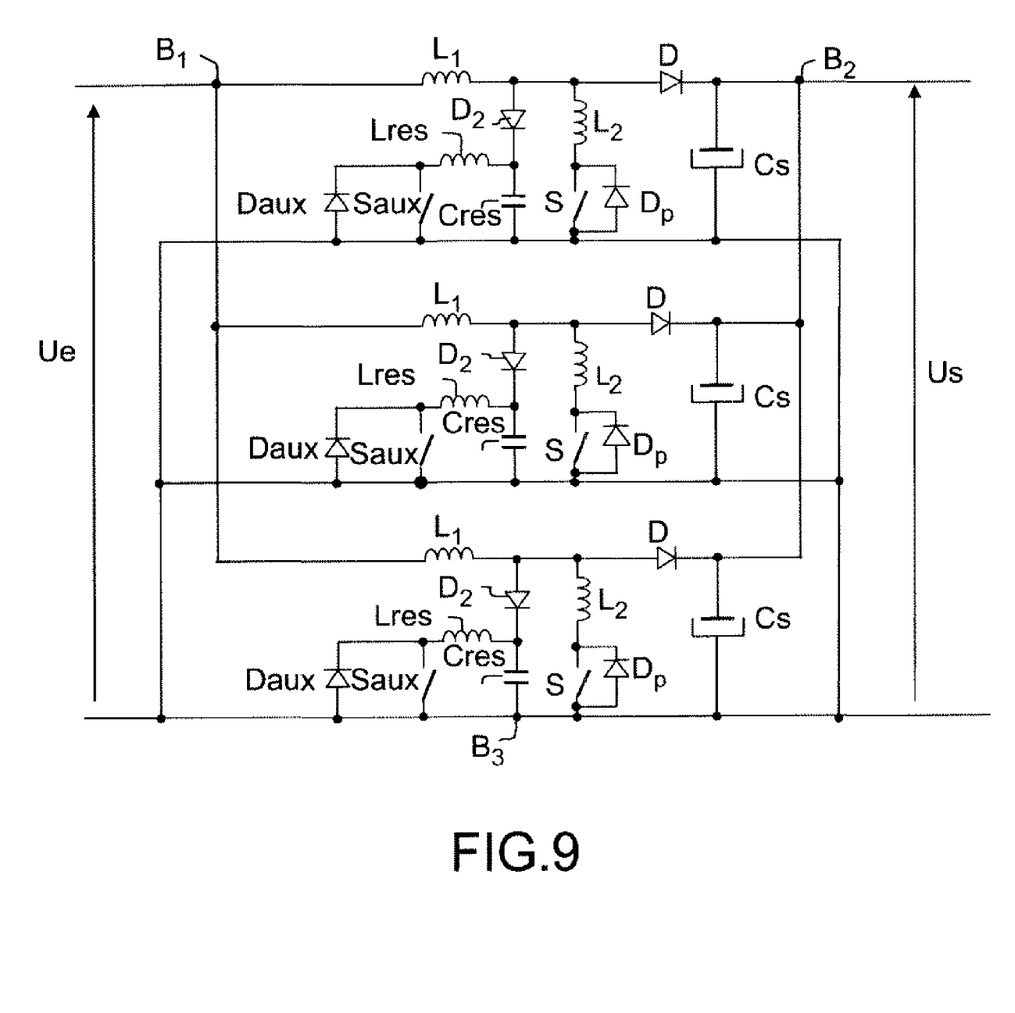

FIGS. 8 and 9 illustrate two embodiments of a power supply with DC DC splitting with n=3 interlaced cells comprising a resonance circuit of the splitting switch S in each cell.

FIG. 8 corresponds to a preferred architecture, with a single output capacitor Cs. The invention makes it possible to produce such an interlaced architecture with a single output capacitor without having to bother about the value of the wiring inductances. Furthermore, the constraints of placement and of cooling the components can be respected.

FIG. 9 corresponds to an architecture with n interlaced cells and n output capacitors, one per cell.

Specifically, the invention makes it possible to produce such an architecture with n output capacitors without the drawbacks of the prior art. Specifically, the wiring inductances L'V (FIG. 3) between the capacitors become an integral part of the resonance inductor L2, thus participating in the resonance phase. In addition, the resonant circuit of the invention removes the need to minimize the wiring inductance Lw of the charge transfer loop (S, D, Cs).

The choice of one or other architecture will in practice be made depending on criteria of availabilities of standard components or on space criteria.

An architecture with n interlaced cells associating a resonant circuit with the splitting switch of each cell therefore makes it possible to obtain a power supply having improved performance, with a tolerance of the architecture to the wiring inductances which results in a very low ripple of the input currents and of the output capacitor(s), a latitude with respect to the geographic installation of the components and an ease of managing the heat of the converter and greater efficiency.

It also has the following additional advantages:
- minimization of switching losses of the switches S and Saux in each cell,
- increased conversion efficiency of each cell,
- reduced losses in the diodes D due to the minor constraints in speed in switching off, minimization of conducted and radiated electromagnetic interference.

A power supply with DC DC splitting according to the invention is more particularly applicable for supplying a regulated voltage to a load Z, based on the voltage supplied by a fuel cell PC (FIG. 4).

The invention claimed is:

1. A power supply with non-isolated DC DC splitting, for supplying a direct current voltage based on a direct current voltage applied to the input, comprising n parallel, interlaced conversion cells, n being at least equal to 2, each cell comprising a main switch receiving a command to switch to the closed state and to the open state in order respectively to close or open a conduction path between a first node and a second node of the cell, allowing respectively a phase for storing energy in a storage element and a phase for transferring energy to an output capacitor connected between an output terminal of the cell and a common terminal, said main switch forming part of a resonant circuit comprising an auxiliary switch making it possible to trigger a resonance phase of the resonant circuit, wherein the auxiliary switch comprises means for triggering the resonance phase while the main switch of the cell in question is in the closed state, said resonance phase allowing the cancellation of the current in said main switch of the cell, and means for opening the main switch during said cancellation of the current, wherein said resonant circuit comprises:
a first inductor connected in series between said switch and said first node, and a first diode connected in parallel to said switch with its anode connected to said second node and its cathode connected to the connection point between the switch and said first inductor; and
a second diode and a resonance capacitor connected in series between said first and second nodes,
a second inductor and an auxiliary switch in parallel on said resonance capacitor, said second inductor being connected to the connection point between said resonance capacitor and said second diode;
a third diode in parallel on said auxiliary switch, with its cathode connected to the connection point between said auxiliary switch and said second inductor.

2. The power supply with non-isolated DC DC splitting, as claimed in claim 1, wherein said resonance phase allows the cancellation of the current in said auxiliary switch, allowing a switching to the open state of said auxiliary switch.

3. The power supply with non-isolated DC DC splitting, as claimed in claim 2, wherein the switching to the open state of said switch of a cell in question is synchronous with the switching to the open state of the auxiliary switch of the resonant circuit of the cell in question.

4. The power supply with non-isolated DC DC splitting as claimed in claim 1, further comprising a single output capacitor common to all the cells.

5. The power supply with non-isolated DC DC splitting as claimed in claim 1, further comprising one output capacitor per cell.

6. The power supply with non-isolated DC DC splitting as claimed in claim 1, wherein the power supply is of the voltage step-up type.

7. The power supply with non-isolated DC DC splitting as claimed in claim 1, wherein the power supply is of the voltage step-down type.

8. The power supply with non-isolated DC DC splitting as claimed in claim 1, wherein the power supply is one of the voltage inverter, the step-down, and the step-up type.

9. A system for powering a load comprising a fuel cell followed by at least one power supply with non-isolated DC DC splitting as claimed in claim 1, in order to supply a regulated level of direct current voltage to said load.

* * * * *